(12) United States Patent
Manohar et al.

(10) Patent No.: US 8,301,933 B2
(45) Date of Patent: Oct. 30, 2012

(54) MULTI-CLOCK ASYNCHRONOUS LOGIC CIRCUITS

(75) Inventors: Rajit Manohar, Ithaca, NY (US); Clinton W. Kelly, San Jose, CA (US); Virantha Ekanayake, San Jose, CA (US); Gael Paul, Aix-en-Provence (FR); Raymond Nijssen, San Jose, CA (US); Marcel Van der Goot, Pasadena, CA (US)

(73) Assignee: Achronix Semiconductor Corporation, Santa Clara, CA (US)

( * ) Notice: Subject to any disclaimer, the term of this patent is extended or adjusted under 35 U.S.C. 154(b) by 504 days.

(21) Appl. No.: 12/559,102

(22) Filed: Sep. 14, 2009

(65) Prior Publication Data

US 2011/0066873 A1    Mar. 17, 2011

(51) Int. Cl.
*G06F 1/00* (2006.01)
*G06F 9/45* (2006.01)

(52) U.S. Cl. .................. 713/500; 713/400; 716/103

(58) Field of Classification Search .............. 713/400, 713/500; 716/103
See application file for complete search history.

(56) References Cited

U.S. PATENT DOCUMENTS

| | | | |
|---|---|---|---|
| 5,272,529 A * | 12/1993 | Frederiksen | ............. 375/240.22 |
| 6,301,655 B1 | 10/2001 | Manohar et al. | |
| 6,381,692 B1 | 4/2002 | Martin et al. | |
| 6,658,550 B2 | 12/2003 | Martin | |
| 6,690,203 B2 | 2/2004 | Nystrom et al. | |
| 7,157,934 B2 | 1/2007 | Teifel et al. | |
| 7,610,567 B2 | 10/2009 | Manohar | |
| 2002/0156995 A1 | 10/2002 | Martin et al. | |
| 2002/0166003 A1 | 11/2002 | Nystrom et al. | |
| 2003/0159078 A1* | 8/2003 | Davies et al. | ................ 713/400 |
| 2004/0136687 A1* | 7/2004 | Ju | .................... 386/46 |
| 2005/0160392 A1 | 7/2005 | Sandbote | |
| 2005/0204245 A1* | 9/2005 | Lee et al. | ....................... 714/744 |
| 2006/0075210 A1 | 4/2006 | Manohar et al. | |
| 2006/0120189 A1 | 6/2006 | Beerel et al. | |
| 2006/0233006 A1 | 10/2006 | Fant | |
| 2007/0200608 A1 | 8/2007 | Fang et al. | |
| 2007/0253240 A1 | 11/2007 | Manohar et al. | |
| 2007/0256038 A1 | 11/2007 | Manohar | |
| 2007/0262786 A1 | 11/2007 | Manohar et al. | |

(Continued)

FOREIGN PATENT DOCUMENTS

KR        101061864        9/2011

(Continued)

OTHER PUBLICATIONS

"International Application Serial No. PCT/US07/67618, Written Opinion mailed Feb. 22, 2008", 4 pgs.

(Continued)

*Primary Examiner* — Chun Cao
(74) *Attorney, Agent, or Firm* — Schwegman, Lundberg & Woessner, P.A.

(57) ABSTRACT

Methods, systems, and circuits for implementing multi-clock designs in asynchronous logic circuits are described. A method may include associating one or more data tokens with a clock domain of a multi-clock domain netlist. A durational relationship between a clock period associated with the clock domain and one or more other clock domains of the multi-clock domain netlist may be determined. Data tokens used in other clock domains may be transformed based on the determined relationship.

28 Claims, 4 Drawing Sheets

U.S. PATENT DOCUMENTS

| | | | |
|---|---|---|---|
| 2008/0012984 A1* | 1/2008 | Wyman et al. | 348/441 |
| 2009/0319962 A1 | 12/2009 | Manohar | |
| 2010/0268978 A1* | 10/2010 | Kelly | 713/500 |

FOREIGN PATENT DOCUMENTS

| | | |
|---|---|---|
| WO | WO-2007127914 A3 | 11/2007 |

OTHER PUBLICATIONS

"International Application Serial No. PCT/US2007/067618, International Preliminary Report on Patentability mailed Nov. 6, 2008", 7 pgs.

"International Application Serial No. PCT/US2007/067618, International Search Report mailed Feb. 22, 2008", 1 pg.

"Korean Application No. 10-2008-7029013, Office Action Response Filed Nov. 1, 2010", w/Engiish translation, 11 pgs.

"Korean Application No. 10-2008-7029013, Office Action mailed Aug. 31, 2010", (w/ English Summary), 4 pgs.

Branover, A., et al., "Asynchronous Design by Conversion: Converting Synchronous Circuits into Asynchronous Ones", Proceedings of the Design, Automation and Test in Europe Conference and Exhibition, (2004), 6 pgs.

"U.S. Appl. No. 11/740,184, Response filed Feb. 19, 2009 to Non-Final Office Action mailed Nov. 19, 2008", 14 pgs.

"U.S. Appl. No. 11/740,184, Non-Final Office Action mailed Nov. 19, 2008", 14 pgs.

"U.S. Appl. No. 11/740,184, Notice of Allowance mailed Jun. 15, 2009", 4 pgs.

Amde, M., et al., "Automating the Design of an Asynchronous DLX Microprocessor", *DAC*, (2003), 502-507 pgs.

Blunno, J. C, et al., "Handshake protocols for de-synchronization", *Proc. of ASYNC'04*, (2004), 10 pgs.

Branover, A., et al., "Asynchronous Design by Conversion: Converting Synchronous Circuits into Asychronous Ones", *Proc. of Date'04*, (2004), 06 pgs.

Mercer, E. G, et al., "Stochastic cycle period analysis in timed circuits", The 2000 IEEE International Symposium on Circuits and Systems, 2000. Proceedings. ISCAS 2000 Geneva. vol. 2, (2000), 172-175.

Mercer, Eric, et al., "Stochastic cycle period analysis in timed circuits", *University of Utah Master Thesis*, Electrical Engineering Department, University of Utah, (May 1999), 78 pgs.

Peng, Song, et al., "Automated synthesis for asychronic FPGAs", *Published in Symposium on Field Programmable Gate Arrays; Computer Systems Laboratory, Cornell University*, Ithaca NY, (2005), 11 pgs.

Teifel, John, et al., "Static Tokens: Using Dataflow to Automate Concurrent Pipeline Synthesis", *In 10th Int'l Symposium on Advanced Research in In Asynchronous Circuits and Systems*, pp. 17-27, Computer Systems Laboratory, Cornell University, Ithaca, NY, (Apr. 2004), 11 pgs.

"U.S. Appl. No. 12/550,582, Response filed Jan. 13, 2012 to Non Final Office Action mailed Sep. 15, 2011", 14 pgs.

"U.S. Appl. No. 12/550,582, Final Office Action mailed Feb. 10, 2012", 12 pgs.

"U.S. Appl. No. 12/550,582, Non Final Office Action mailed Sep. 15, 2011", 13 pgs.

"U.S. Appl. No. 12/550,582, Response filed Apr. 10, 2012 to Final Office Action mailed Jan. 10, 2012", 10 pgs.

"Japanese Application Serial No. 2009-507982, Office Action mailed Dec. 20, 2011", 7 pgs.

* cited by examiner

MULTI-CLOCK ASYNCHRONOUS LOGIC CIRCUITS

BACKGROUND

Traditional synchronous circuit designs may be represented using a variety of description languages, netlists, and schematics. All of these synchronous representations may define functionality of the circuits in the presence of a timing signal used to synchronize operations. Synchronous operations have several advantages, including deterministic behavior, simplified design/testing, and portability. However, there are also occasions the use of asynchronous operations is desirable.

BRIEF DESCRIPTION OF THE DRAWINGS

Some embodiments of the disclosed technology are illustrated by way of example and not limitation in the figures of the accompanying drawings in which.

DETAILED DESCRIPTION

Figure 1:
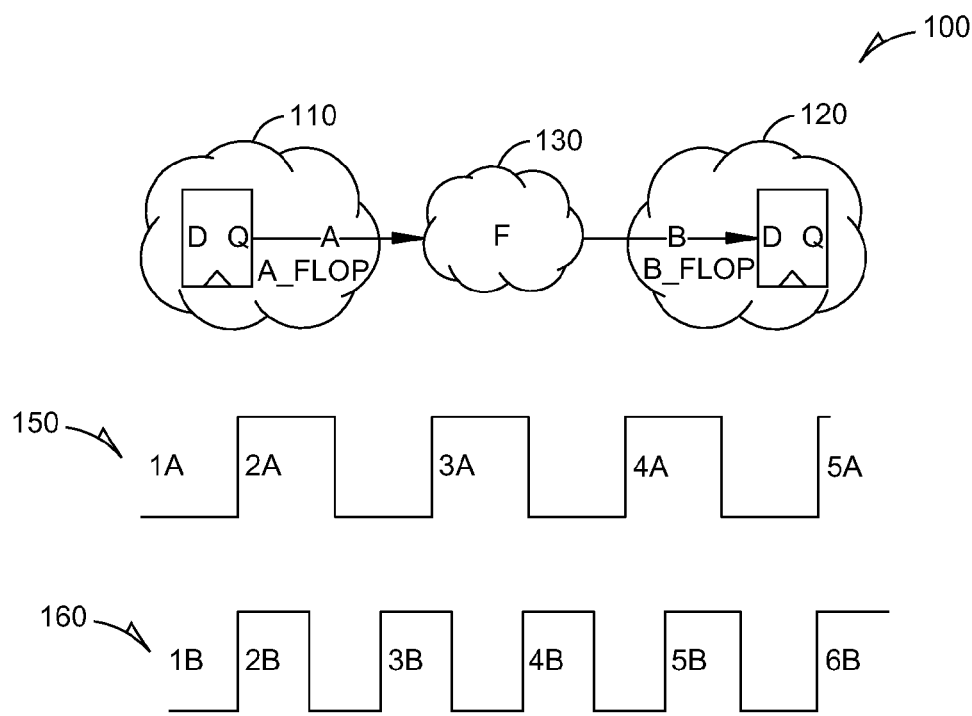
FIG. 1 illustrates an example multi-clock domain circuit design using related clock signals, according to various embodiments.

Example methods, systems, and circuits that implement multi-clock designs in asynchronous logic circuits will now be described. In the following description, numerous examples having example-specific details are set forth to provide an understanding of example embodiments. It will be evident, however, to one of ordinary skill in the art, after reading this disclosure, that the present examples may be practiced without these example-specific details, and/or with different combinations of the details than are given here. Thus, specific embodiments are given for the purpose of simplified explanation, and not limitation.

Some example embodiments described herein may include a method comprising associating one or more data tokens (described below) with a clock domain of a multi-clock domain netlist. A durational relationship between clock periods associated with the clock domain and one or more other clock domains of the multi-clock domain netlist may be determined. When using the data tokens in other clock domains, the data tokens may be transformed to operate in the other domains based on the relationship.

Embodiments may include a method for converting a synchronous design that contains synchronous elements with "unrelated" clock domains into an asynchronous design with equivalent functionality. The clock domain may be considered "unrelated," for example, when their associated clock signals do not have a repeating period that corresponds to a least common multiple of the cycle times of the clock signals. The method may be applied to a complete synchronous circuit, or to part of a synchronous circuit. In some embodiments, the method may be applied to complex synchronous designs having clock gating, multiple clock domains, or other advanced features.

The context for the present disclosure is the previously disclosed system and method for automated conversion of a synchronous circuit representation to and from an asynchronous circuit representation (described in co-pending patent application Ser. No. 11/740,184, entitled "Systems and Methods for Performing Automated Conversion of Representations of Synchronous Circuit Designs to And from Representations of Asynchronous Circuit Designs," commonly assigned to the assignee of the embodiments described herein, filed on Apr. 25, 2007, and incorporated herein by reference in its entirety, referred to hereafter as "PA184"). The previously disclosed method will be briefly described below.

The method described in PA184 may operate to receive a description of a synchronous netlist with additional information that may normally be used for design synthesis. The additional information, for example, may be related to a set of clock signals and their operating frequencies (or even a single clock signal, without noting the frequency), a set of multi-cycle paths (if present), and constraints on input and output signals with respect to appropriate clocks. In addition, any signal that is to remain synchronous may also be specified. In some embodiments, it may be assumed that all primary inputs and outputs are synchronous.

The synchronous netlist may contain one or more sets of gates that form combinational logic, and one or more sets of elements that form state-holding logic. For example, consider four types of state-holding elements: positive edge-triggered flip-flops (PFLOPs), negative edge-triggered flip-flops (NFLOPs), latches that are transparent when their clock input is high (PLATCH), and latches that are transparent when their clock input is low (NLATCH).

The synchronous netlist may be converted to an asynchronous format, or target netlist, using the synchronous to asynchronous conversion method described in PA184. This asynchronous implementation may be equivalent to the synchronous one in terms of the computations performed. The conversion method may include a method for generating annotations that translate the performance characteristics of the asynchronous implementation back into the synchronous domain using an annotation generator (see PA184).

The target asynchronous netlist may, for example, represent circuits that can be implemented efficiently as fine-grained asynchronous pipelines. The target asynchronous netlist may represent an asynchronous dataflow graph. Nodes in the dataflow graph may operate on data values, referred to as data tokens. A data token may comprise a data item that can flow through an asynchronous pipeline. The data token can have a one-bit value or a multi-bit value. Operators in the dataflow graph may receive data tokens on their inputs and produce data tokens on their outputs. The change in the value of the data tokens may be used to compute results.

In some embodiments, connectivity between operators may be specified by arrows, which correspond to communication channels along which tokens can be sent and received. Communication channels may be buffered or not, and sending and receiving a token on a channel may correspond to rendezvous synchronization. In a synchronous to asynchronous conversion algorithm, each signal may be mapped to an edge in the dataflow graph, and the different gates from the synchronous netlist are translated into dataflow operators.

The presence of multiple synchronous clock domains where the clock domains are synchronous with respect to one another can add complexity to the conversion algorithm previously disclosed (see PA184). For example, issues may arise at the interface between two state-holding elements from different clock domains. In the method of PA184, the clock cycle times can be rational multiples of each other. In that case, computations may be statically unrolled to find a repeating period that may correspond to the least common multiple of the cycle times associated with clock signals in the computation. This case may be referred to as the "related" clock domain conversion case. When it is impractical to unroll the computation to find a repeating period (for instance, when the clock cycle times are not simple multiples of each other), the clocks may be considered as being "unrelated".

A property preserved by the method of PA184 addresses the correspondence between tokens and clock edges. For each clock domain, the value of a signal during clock cycle number k may correspond to the value of the asynchronous data token on the corresponding asynchronous channel that has sequence number k. In the presence of clock gating, this relationship may become more complicated, depending on the knowledge of when the clock domain is gated, if at all. In the following description, asynchronous signals (i.e., data tokens) may be referred to as being part of a clock domain when their corresponding synchronous signals belonged to that clock domain.

FIG. 1 illustrates an example multi-clock domain circuit design 100 using related clocks signals 150 and 160, according to various embodiments. Clock domains 110 and 120 may comprise flip-flops (e.g., an A-flop and a B-flop). The clock signals 150 and 160 associated, respectively, with clock domains 110 and 120 may represent two related clock signals. The relationship may be durational relationship characterized by operating frequencies of the clock signals having a three-to-four relationship (e.g., for every three cycles of clock signal 150, there are four cycles of the clock signal 160). Labels 1A, 2A . . . 5A represent data tokens corresponding to data signals (after converting to the asynchronous design) at successive edges of the clock signal 150 (associated with domain 110). Similarly, labels 1B, 2B . . . 5B represent data tokens corresponding to data signals (after converting to the asynchronous design) at successive edges of the clock signal 160 (associated with domain 120).

A logic circuit 130 between the clock domains 110 and 120 may comprise a number of combinational logic elements that are assumed to operate on their inputs to produce an output over a time period that is substantially less than the period of one of the clock cycles in the clock signals 150 and 160. The logic circuit 130 may execute a function F( ) on the data tokens incoming from clock domain 110 (e.g., 1A, 2A . . . 5A). The data tokens corresponding to the executed function F( ) at the clock domain 120 may be represented by F(A), where A represents a data token in clock domain 110 (e.g., one of 1A, 2A . . . 5A).

When a data token 2A is passed to the combinational logic circuit 130, the value propagated to the clock domain 120 is given by F(2A), which is also designated as data token 2B. In the next cycle of the clock signal 160, the data token 3B still corresponds to F(2A) because data token 2A has not yet changed to 3A. In other words, the stable value at the end of the clock cycle associated with data token 2B and at the next positive edge of the clock signal 160 is F(2A). Hence, at these times (i.e., at the end of the clock cycle associated with data token 2B and at the next positive edge of the clock signal 160), the data token F(2A) may be sampled by the B-flop in clock domain 12. That is the data token F(2A) may correspond, within the clock domain 120, to both of the data tokens 2B and 3B.

Similarly, the data token F(3A) may correspond to data tokens 4B, and F(4A) may correspond to data token 5B. At the beginning of data tokens 5A and 6B a new pattern may start and keep repeating. Based on the above observation, the data tokens may be transformed using the relationship between the clock cycle times ("clock periods") of the clock signals 150 and 160. The transformation may be described as follows: data token F(2A) is passed through to domain 120 and then repeated once; data token F(3A) is passed through to domain 120; data token F(4A) is passed through to domain 120. As a result, the transformation in this case operates to translate three data tokens in domain 110 into four data tokens in domain 120 based on the three-to-four relationship between the clock signal periods of the clock domains 110 and 120.

Figure 2:
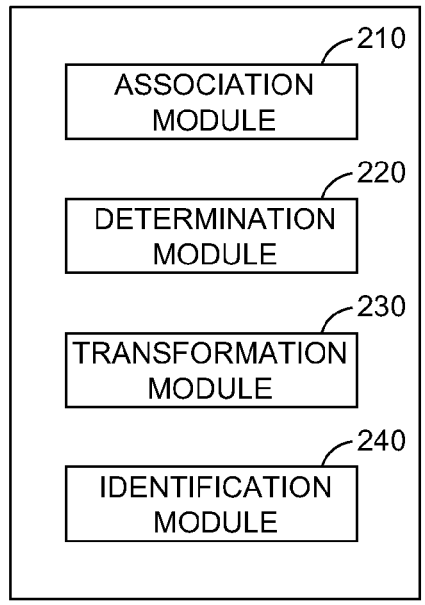
FIG. 2 is a block diagram illustrating an example system for implementing multi-clock designs in asynchronous logic circuits, according to various embodiments.

FIG. 2 is a block diagram illustrating an example system 200 for implementing multi-clock designs in asynchronous logic circuits, according to various embodiments. The system 200 may include an association module 210, a determination module 220, a transformation module 230, and an identification module 240. The above-identified modules may be implemented in hardware and/or software. The software (e.g., instructions 724 shown in FIG. 7) may be stored on memory (e.g., memory 770 shown in FIG. 7) and be executed by one or more processors (e.g., processor 760 shown in FIG. 7). The identification module 240 may operate to identify at least some of the clock domains (e.g., clock domain 110 and 120 of FIG. 1) in the multi-clock domain netlist.

The association module 210 may operate to associate a data token (e.g., one of data tokens 1A, 2A . . . 5A of FIG. 1) with a clock domain (e.g., clock domain 110 of FIG. 1) of a multi-clock domain netlist. The data tokens may be associated with the same clock domain as the clock domain that their corresponding data signals in the synchronous design are associated with. For example, data signals in the synchronous design that correspond to clock domain 120 may be represented by data tokens (e.g., 1B, 2B . . . 5B, of FIG. 1), associated with clock signal 160.

The determination module 220 may operate to determine a relationship between a clock period associated with two or more clock domains in the multi-clock domain netlist. For example, the determination module may determine that the clock period corresponding to the clock signal 150 of FIG. 1 associated with clock domain 110 has a three-to-four relationship with the clock period corresponding to the clock signal 160 of FIG. 1 associated with clock domain 120.

The determination module 220 may also determine that the clock period associated with the clock domain is related to more than one clock domain. One or more clock domains may be said to be "related" if there exists a rational number representing a repeating period that corresponds to the least common multiple of the clock periods corresponding to clock signals associated with those clock domains. For example, clock signals 150 and 160 both of FIG. 1 may be said to be related if the clock periods of the clock signal 150 and 160 are rational multiples of each other (e.g., having periods of 4 and 3 nanosecond (ns), respectively, where the ratio 4/3 is a rational number). In this case, the repeating period corresponding to clock periods of 4 and 3 ns might be determined by the determination module 220 to be 12 ns.

In some embodiments, the determination module 220 may be configured to determine that two clock periods are "unrelated" when the repeating period is substantially larger than each clock period. For the purposes of this disclosure, "substantially larger" means a repeating period that is larger than a predefined threshold value or is at least 10 times larger than that of the largest of the clock periods in the domains being considered. For example, if the clock periods corresponding to signals 150 and 160 are 3 and 3.01 ns, the repeating period (i.e., the least common multiplier of the numbers 3 and 3.01) might be 903 ns, which is substantially larger than 3 ns. Therefore, in this scenario, the determination module may consider the clock domains 110 and 120 as being unrelated. The transformation module 230 may operate to transform the data token (e.g., one of data tokens 1A, 2A . . . 5A of FIG. 1) when using the data token in another clock domain (e.g., clock domain 120 of FIG. 1), based on the durational relationship (e.g., the three-to-four relationship) between the clock periods of the clock signals 150 and 160 both of FIG. 1.

Returning to FIG. 1, consider a scenario where clock domains 110 and 120 are related and clock domain 110 has a lower operating frequency than clock domain 120. In this scenario the transformation module 230 may operate to translate three data tokens in domain 110 (e.g., 2A, 3A, and 4A) into four data tokens (2B, 3B, 4B, and 5 B) in domain 120 based on a three-to-four relationship between the clock periods corresponding to clock signals associated with the clock domains 110 and 120, respectively. In other words, it can be said that the transformation module 230 up-samples the data token (e.g., data token 2A), when the clock period (e.g., 4 ns) associated with the clock domain (e.g., clock domain 110) is longer than the clock period (e.g., 3 ns) associated with the other clock domain (e.g., clock domain 120). Additional clock domains may be treated in a similar manner.

In some embodiments, the clock domain 110 may have higher operating frequency than clock domain 120. In this case, the transformation module 230 may down-sample the data token when the clock period associated with the clock domain 110 is smaller than the clock period associated with the other clock domain (e.g., clock domain 120). The down-sampling may occur because some data tokens from clock domain 110 are dropped when transforming to clock domain 120. The down-sampling may occur when, for example, for some clock edges of the clock signal associated with clock domain 120, no new data tokens from clock domain 110 are transformed.

Therefore, in many embodiments, the net effect of transforming data tokens when going from one clock domain to a related clock domain may be characterized as either up-sampling or down-sampling of a data token, depending on the clock period durational relationship. The operation of the transformation module 230 in the up-sampling case is shown in FIG. 3 and described below.

Figure 3:
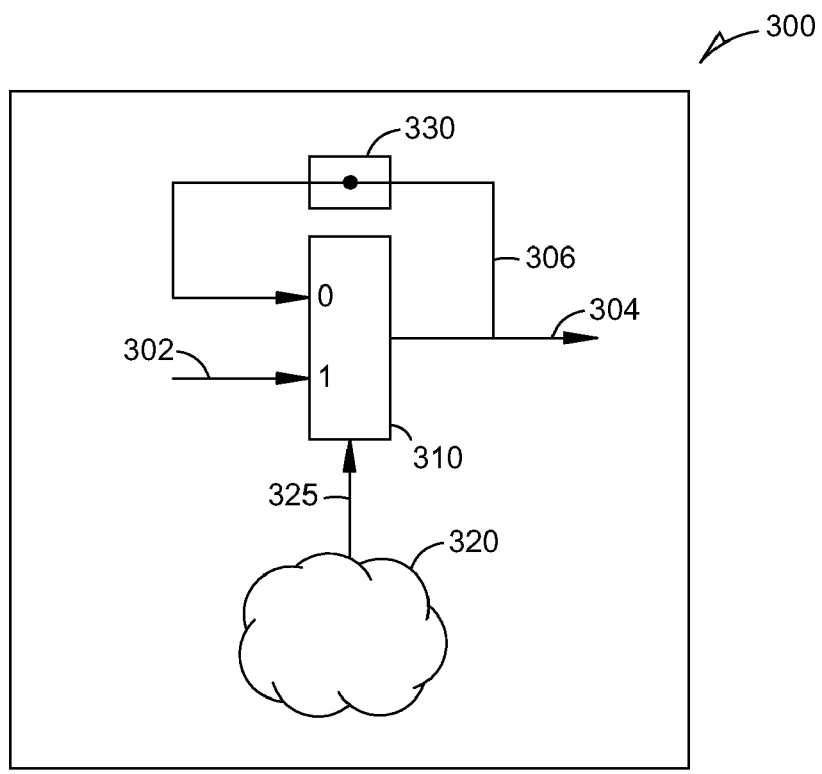
FIG. 3 is a block diagram illustrating example up-sampling transformation module of the system of FIG. 2, according to various embodiments.

FIG. 3 is a block diagram illustrating an example up-sampling transformation module 300 of the system of FIG. 2, according to various embodiments. The up-sampling transformation module 300, which is similar to or identical to the transformation module 230, may comprise an up-sampler block 310, a pattern generator 320, and an initial block 330. The up-sampling transformation module 300 may act as an interface circuit between two related clock domains 110 and 120 both of FIG. 1. The input data token 302, from clock domain 110, may be transformed into an output data token 304 to be fed into the clock domain 120 of FIG. 1. The assumption in this case is that the clock domain 120 has a higher operating frequency than clock domain 110.

As described above, this transformation may involve up-sampling of the input data token 302 before sending it to clock domain 120. The up-sampler block 310 may take the input data token 302 from the clock domain 110 and produce the output data token 304. The input data token 302 may be propagated to the output of the module 300 as output data token 304, and may be repeated depending on the relative operating frequencies of clock domains 110 and 120. For instance, if the clock domain 120 operates at twice the frequency of clock domain 110, then every input data token 302 may be duplicated by twice appearing as the output data tokens 304 using feedback.

Thus, to accomplish the duplication, a feedback channel 306 may be introduced that contains a data token whose value replicates the last input data token 302. The initial block 330 may copy the replica as a fed-back data token 308 to input 0 of the up-sampler block 310. The up-sampler block 310 may, depending on a value of a control signal 325, copy either the input data token 302 or the fed-back data token 308 to generate the output data token 304.

To determine when the previous value of the input data token 302 is to be repeated and when a new value is to be accepted, the up-sampler block 310 may use the control signal 325. The pattern generator 320 may generate a deterministic repeating sequence (e.g., the control signal 325) that controls the up-sampler block 310. For example, when the control signal 325 is "0", the previous value may be repeated by propagating the fed-back data token 308 to generate output data token 304. When the control signal is "1", a newly received value of the input data token 302 at input 1 of the up-sampler block 310 may be propagated to generate the output data token 304, which is also used to update the value of data token 306.

For embodiments where the clock domain 110 has a higher operating frequency than the clock domain 120, the transformation module 230 of FIG. 2 may take on the form of a down-sampling transformation module 400, operating as described below.

Figure 4:
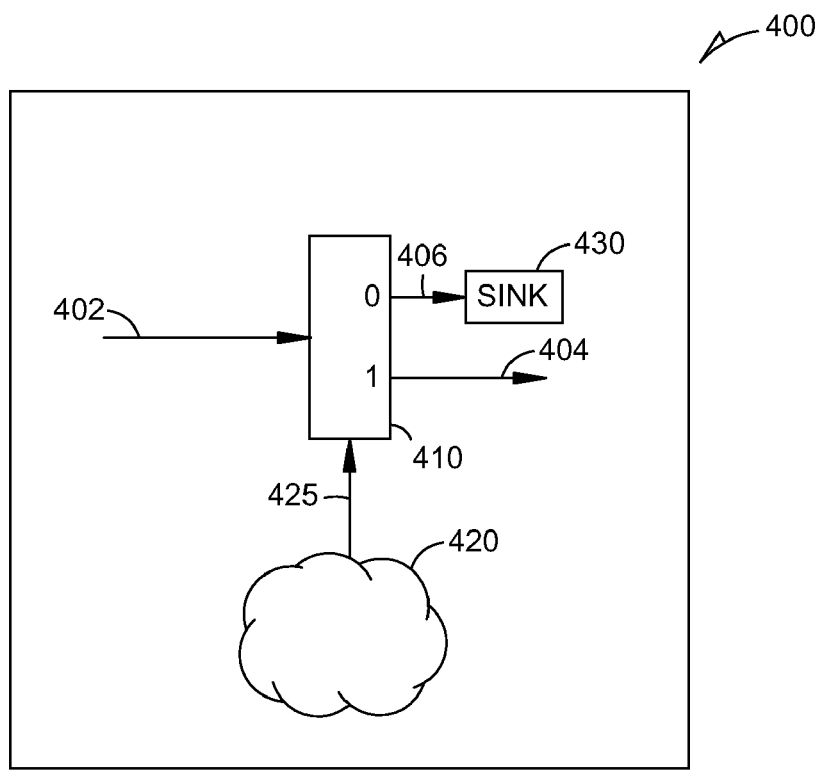
FIG. 4 is a block diagram illustrating an example down-sampling transformation module of the system of FIG. 2, according to various embodiments.

FIG. 4 is a block diagram illustrating an example down-sampling transformation module 400 of the system of FIG. 2, according to various embodiments. The down-sampling transformation module 400 may comprise a down-sampler block 410, a pattern generator 420, and a sink block 430. The down-sampling transformation module 400 may operate to transform an input data token 402 received from the clock domain 110 of FIG. 1 into an output data token 404 to be fed into clock domain 120 of FIG. 1.

The down-sampling operation may take place by discarding some of the input data tokens 402. To discard a data token, the down-sampler block 410 may simply consume the data token in the sink block 430. The process of discarding may be controlled by a control signal 425 generated by the pattern generator 420. The pattern generator 420 may operate to generate deterministic repeating sequences (e.g., comprising the control signal 425). For example, when the control signal 425 is "0", the previous value of the input data token 402 may be directed to output 0 of the down-sampler block 410 to be consumed by the sink block 430. When the control signal is "1", a newly received value of the input data token 402 may be propagated to output 1 to generate the output data token 404 that is fed to the clock domain 120 of FIG. 1.

In both the up-sampling and down-sampling scenarios, the pattern generators 320 and 420 may generate the control signals 325 and 425 of FIGS. 3 and 4, respectively, according to the clock relationships between clock domain 110 and domain 120 both of FIG. 1. In particular, the pattern generators 320 and 420 may operate independently of information about data tokens that is communicated between the two clock domains. Hence, the transformation procedure that translates a synchronous circuit description to an asynchronous implementation can pre-compute the control signals 325, 425 provided by the pattern generators 320 and 420.

In some embodiments, the pattern generators 320 and 420 may comprise finite state machines. The finite state machines may constitute a part of a final asynchronous implementation of the synchronous circuit description. In certain embodiments, the pattern generators can be shared. For example, when there are multiple clock domain crossings between two domains and pairs of clock domains have similar durational relationships (e.g., the 4:3 relationship described above). The pattern generators may also be replicated for other clock domain crossings. In an embodiment, some combination of sharing and replicating may be practiced so that a set of replica pattern generators may be shared by a number of different clock domain crossings.

In some embodiments, the clock relationship-based transformations outlined above may be applied with respect to two clock signals that have durational relationships (e.g. the 4:3 relationship described above, or a 1:1 relationship, among others) with a pre-determined phase offset relative to each other. In this case, the sequence of values produced by the pattern generators 320 or 420 may change, and the amount of change can be determined by examining the relationships between the edges of the two clocks, as described previously.

In some embodiments, the clock relationship-based transformations outlined above may be applied to the procedure described in PA184 for handling positive and negative edge-triggered flip-flops. For example, the relationship between a PFLOP and NFLOP (e.g., A-flop ad B-flop both of FIG. 1) may be thought of as a one-to-one clock relationship with a phase offset. The net effect of this transformation may be that the first data token from one clock domain may be discarded, and then every other value can be passed through unmodified. The particular data token discarded may depend on the definition of the first clock cycle in the entire system.

The embodiments outlined above can also be considered as constructing deterministic clock relationships in a flexible manner. For instance, consider a synchronous design that has multiple clock domains (e.g., clock domains 110 and 120 both of FIG. 1), where clock domain 110 operates at a frequency that has a 5:3 ratio to the frequency of clock domain 120. In a traditional synchronous implementation, a phase lock loop (PLL) circuit can be used to construct this deterministic relationship between the two clock domains (e.g., 5:3 relationships between operating frequencies).

However, the number of clock domains may be limited by the available number of PLLs on a chip. In the method described above, clock relationships are maintained without using any PLLs. Hence, embodiments of the up-sampling and down-sampling transformation modules 300 and 400 can be used to create a "virtual PLL" by the appropriate insertion of clock domain conversion interface circuits replacing the up-sampler block 310 and the down-sampler block 410 of FIGS. 3 and 4, respectively.

In some embodiments, the clock domain conversion interface circuits may operate to create one or more new clock domains operating at some selected frequency, without the explicit use of clocks or PLLs that operate at this frequency. These "virtual" clock domains may be created by using the clock domain conversion interface circuits to convert from one or more of the existing clock domains to the virtual clock domains operating at the selected frequency. Multiple ones of these virtual clock domains can be created, each having a different frequency, if desired. The up-sampling and down-sampling transformation modules 300 and 400 discussed above may be used when interfacing "related" clock domains. For the cases where a synchronous design includes "unrelated" clock domains the embodiment shown in FIG. 5 and described below may be used.

Figure 5:
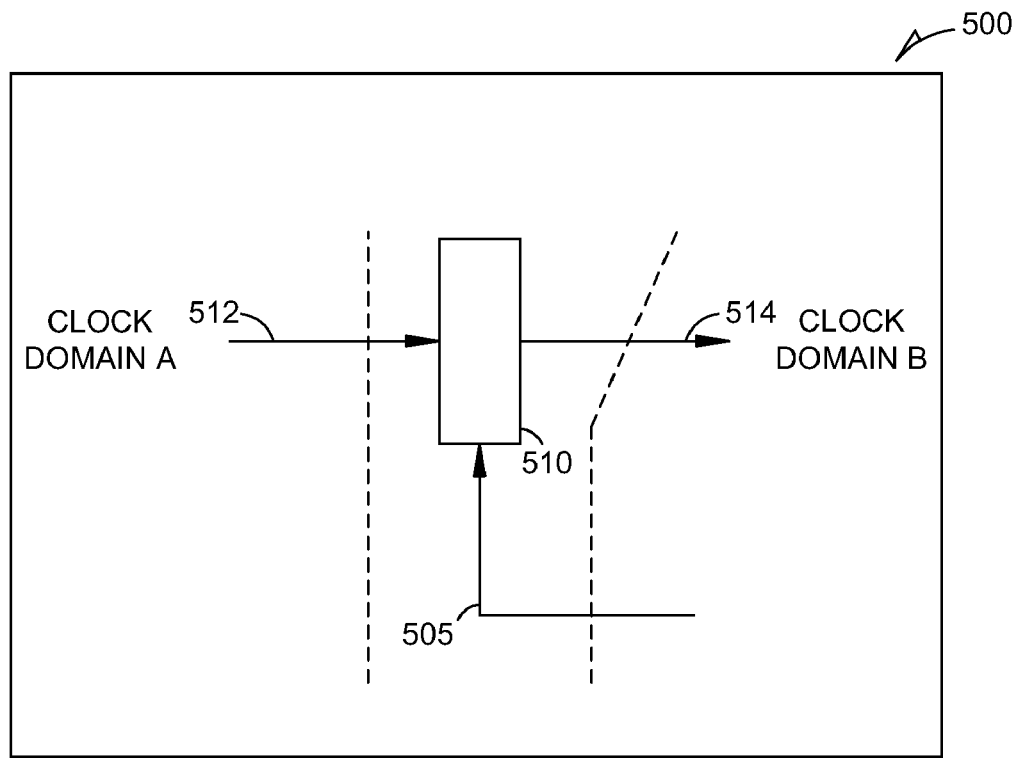
FIG. 5 is a diagram illustrating an example up-down sampling transformation module of the system of FIG. 2, according to various embodiments.

FIG. 5 is a diagram illustrating an example up-down sampling transformation module 500 of the system of FIG. 2, according to various embodiments. The unrelated clock domains, as mentioned above, may be referred to as clock domains where the operating frequency of the associated clock signals are not rational multiples of each other. Also, the term unrelated can be used to describe clock domains that are in fact related, based on the above definition, but where the repeating period corresponding to the least common multiple of the cycle times is substantially larger than the cycle times of the clock signals associated with the clock domains.

For example, if clock signal associated with a clock domain (e.g., clock domain 110 of FIG. 1) has a cycle time of 4 ns, and a clock signal associated with another clock domain (e.g., clock domain 120 of FIG. 1) has a cycle time of 4.01 ns, the least common multiple would correspond to 1604 ns, which is approximately 400 times larger than the greatest of the cycle times of the clock signals associated with either of the clock domains 110 or 120. A combination of a down-sampler and pattern generator, for example, can be used to interface the two clock domains 110 and 120 in this case, but may involve the use of a long (e.g., 1604 ns) pattern. In this scenario, a synthesis tool may regard the two clock domains 110 and 120 as unrelated, simply because the repeating period includes a substantially large number of clock cycles.

In the synchronous realm, techniques exist to determine thresholds for large repeating periods that can be used by synthesis tools. One such method that is known to those of ordinary skill in the art may operate to examine the worst-case edge-to-edge distance of the clock periods (e.g., 10 ps in the above example) and determine whether it is possible for a synchronous implementation to operate correctly without introduction of timing violations. The analysis may take into account various parameters such as delay times of the conversion circuits including setup and insertion delays, as well as the uncertainty in parameter values.

The up-down sampling transformation module 500 may include an up-down sampler block 510. In this case, the assumption is made that the clock domains 110 and 120 both of FIG. 1 are unrelated. The up-down sampler block 510 may take an input data token 512 from a clock domain 110 and generate an output data token 514 to be fed to the clock domain 120. While the up-down sampler block 510 may operate asynchronously with respect to clock domains 110 and 120, the control input 505 can arrive from clock domain 120, and may comprise any signal from the clock domain 120. This is the case because its value may not be used by the up-down sampler block 510; rather its timing information may be used as described below.

The up-down sampler block 510 may have a local state that can hold the last received value of the input data token 512. This value may be initialized to be the initial value of a data signal in the corresponding synchronous design. Thus, whenever a new input data token 512 arrives, the local state in the up-down sampler block 510 may be updated with the value of the new input data token 512. The current value held by the local state may be propagated thereafter as the output data token 514, whenever a control input 505 arrives. Therefore, the control signal 505 may provide control for both down-sampling, by dropping some held values (i.e. not propagating them to the output), and up-sampling, by repeating some values (i.e. propagating the same value to output multiple times).

In some embodiments, an additional control signal may be provided from the clock domain 110. The additional control signal may control the updating of the values held in the local state stored in the up-down sampler block 510. A value held in the local state may be updated when a new input data token 512 and the additional control signal are both received by the up-down sampler block 510.

Further details of the up-down sampler block 510 will not be given here, as they are well known to a person of ordinary skill in the art. For example, a token based solution may combine the up-sampler block 310 and down-sampler block 410 with an arbiter module. In another embodiment, a solution may comprise a register for holding a local value with an arbitrated read and write port.

The up-down sampling transformation module 500 may exhibit meta-stability when a race condition on the arrival of the input data token 512 from clock domain 110 and the control input 505 from clock domain 120 occurs. The meta-stability condition may be acceptable because it is a behavior that is exhibited by the original synchronous design as well. The presence of meta-stability in the unrelated clock domain conversion process may introduce inherent non-deterministic behavior which is not produced using deterministic dataflow building blocks, as disclosed in the conversion method of PA184.

Figure 6:
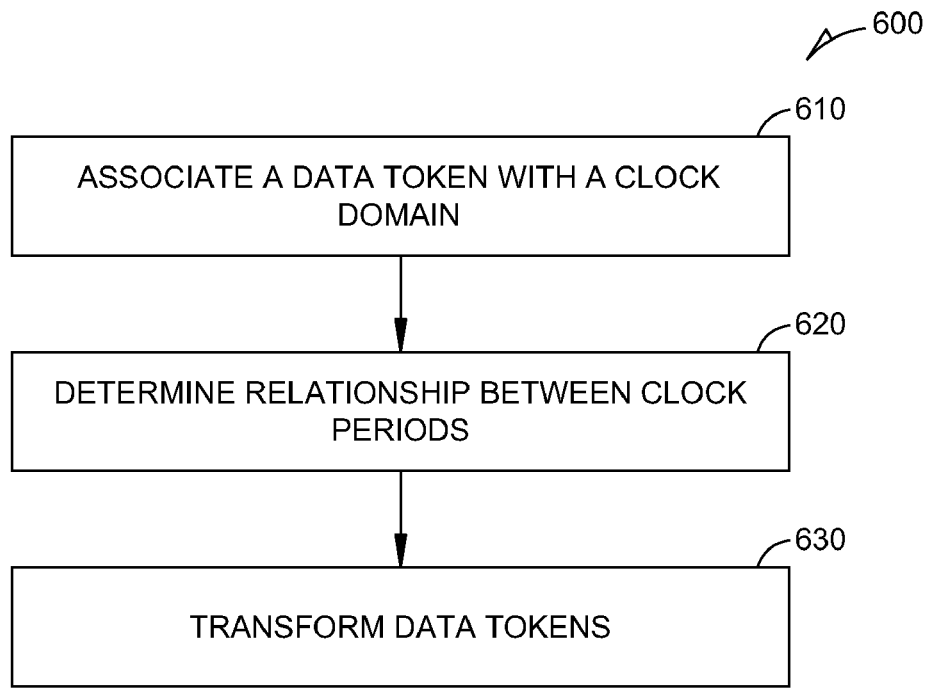
FIG. 6 is a diagram illustrating an example method of implementing multi-clock designs in asynchronous logic circuits, according to various embodiments.

FIG. 6 is a diagram illustrating an example method 600 of implementing multi-clock designs in asynchronous logic circuits, according to various embodiments. The method 600 may start at operation 610, where the association module 210 of FIG. 2 operates to associate a data token with a clock domain (e.g., any of clock domains 110 or 120 both of FIG. 1) taken from a multiple clock domain netlist.

At operation 620, the determination module 220 may determine a relationship (e.g., a three-to-four relationship) between a clock period of a clock signal associated with the clock domain (e.g., clock domain 110) and one or more other clock domains (e.g., clock domain 120). The relationship may be characterized as one of "related" or "unrelated," as described above with respect to FIGS. 3 and 4. Domains are "related" when they are not "unrelated".

At operation 630, the transformation module 230 may operate to transform the data token at the interface of the clock domain with one or more other clock domains (e.g., clock domain 120 of FIG. 1) when using the data token in the one or more other clock domains, based on the durational timing relationship between the domains. The transformation may take the form of up-sampling, down-sampling, or up-down sampling as described above with respect to FIGS. 3-5.

Figure 7:
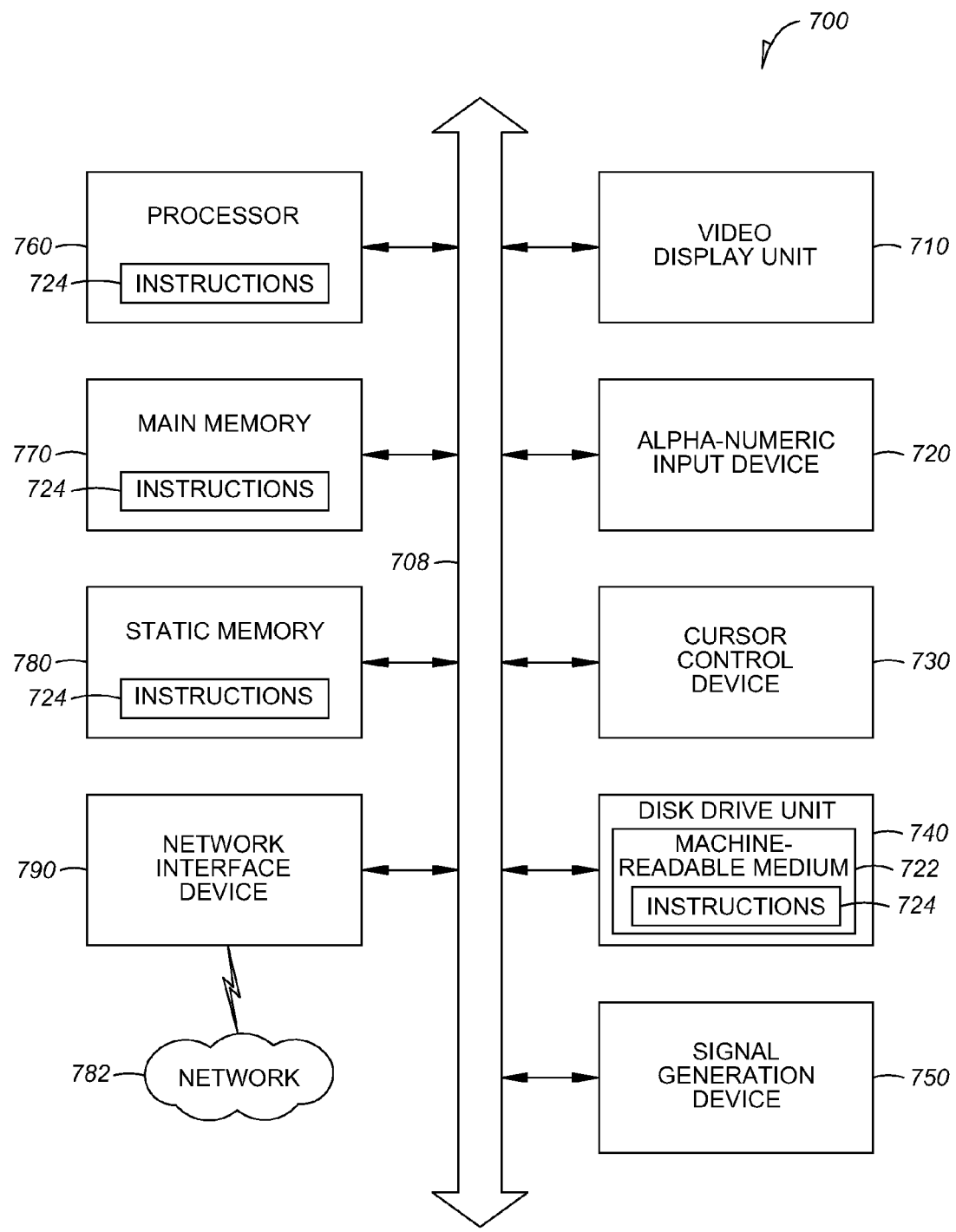
FIG. 7 is a diagram illustrating a system according to various embodiments.

FIG. 7 shows a diagram illustrating a system 700, according to various embodiments. The system 700 may comprise a set of instructions that can be executed to cause the system 700 to perform any one or more of the methodologies discussed herein. In alternative embodiments, the system 700 may operate as a standalone device or may be connected (e.g., networked) to other systems. In a networked deployment, the system 700 may operate in the capacity of a server or a client system in a server-client network environment or as a peer system in a peer-to-peer (or distributed) network environment. System 700 may be realized as a specific machine in the form of a computer, and may be similar to or identical to the system 200 of FIG. 2. Further, any of the elements of system 700 (e.g., the processor 760 or the memory 770, among others) may include system 200.

The system 700 may comprise a server computer, a client computer, a personal computer (PC), a tablet PC, an integrated circuit, an asynchronous FPGA, or any system capable of executing a set of instructions (sequential or otherwise) that specify actions to be taken by that system. Further, while only a single system is illustrated, the term "system" shall also be taken to include any collection of systems that individually or jointly execute a set (or multiple sets) of instructions to perform any one or more of the methodologies discussed herein.

The example system 700 may include a processor 760 (e.g., a central processing unit (CPU), a graphics processing unit (GPU) or both), a main memory 770 and a static memory 780, all of which communicate with each other via a bus 708. The system 700 may further include a video display unit 710 (e.g., a liquid crystal display (LCD) or cathode ray tube (CRT)). The system 700 also may include an alphanumeric input device 720 (e.g., a keyboard), a cursor control device 730 (e.g., a mouse), a disk drive unit 740, a signal generation device 750 (e.g., a speaker), and a network interface device 790.

The disk drive unit 740 may include a machine-readable medium 722 on which may be stored one or more sets of instructions (e.g., software) 724 embodying any one or more of the methodologies or functions described herein. The instructions 724 may also reside, completely or at least partially, within the main memory 770 and/or within the processor 760 during execution thereof by the system 700, with the main memory 770 and the processor 760 also constituting machine-readable media. The instructions 724 may further be transmitted or received over a network 782 via the network interface device 790.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium capable of storing, encoding, or carrying a set of instructions for execution by the machine and that cause the machine to perform any one or more of the methodologies of the present technology. The term "machine-readable medium" shall accordingly be taken to include, but not be limited to, tangible media, including solid-state memories and optical and magnetic media.

Various embodiments related to implementing multi-clock designs in asynchronous logic circuits have been described. The embodiments may provide a new interface technique to handle interfaces between related and unrelated clock domains. Although example embodiments have been described, it will be evident, after reading this disclosure, that various modifications and changes may be made to these embodiments. Accordingly, the specification and drawings are to be regarded in an illustrative rather than a restrictive sense.

The abstract of the Disclosure is provided to comply with 37 C.F.R. §1.72(b), requiring an abstract that allows the reader to quickly ascertain the nature of the technical disclosure. It is submitted with the understanding that it will not be used to interpret or limit the claims. In addition, in the foregoing Detailed Description, it may be seen that various features are grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment.

What is claimed is:

1. A processor-implemented method to execute on one or more processors that perform the method, comprising:
   associating at least one data token with a clock domain of a multi-clock domain netlist of a synchronous circuit design;

determining a durational relationship between clock periods associated with the clock domain and at least one other clock domain of the multi-clock domain netlist;

transforming the at least one data token when using the at least one data token in the at least one other clock domain, based on the relationship; and converting the multi-clock domain netlist of the synchronous circuit design into an asynchronous representation using the at least one data token being transformed.

2. The method of claim 1, wherein the multi-clock domain netlist is a synchronous netlist.

3. The method of claim 1, further comprising identifying at least some of the clock domains of the multi-clock domain netlist.

4. The method of claim 1, wherein the determining of the relationship comprises determining that the clock period associated with the clock domain and the at least one other clock domain are related.

5. The method of claim 1, wherein the transforming comprises up-sampling the at least one data token, when the clock period associated with the clock domain is longer than clock period associated with the at least one other clock domain.

6. The method of claim 5, wherein the up-sampling comprises repeating at least one instance of the at least one data token, based on a value of a control signal.

7. The method of claim 1, wherein the transforming comprises down-sampling the at least one data token, when the clock period associated with the clock domain is shorter than clock period associated with the at least one other clock domain.

8. The method of claim 7, wherein the down-sampling comprises dropping at least one instance of the at least one data token, based on a value of a control signal.

9. The method of claim 1, wherein the determining of the relationship comprises determining that the clock periods associated with the clock domain and the at least one other clock domain are unrelated.

10. The method of claim 9, wherein the transforming comprises up-down sampling the at least one data token.

11. The method of claim 10, wherein the up-down sampling comprises sampling a last value of the at least one data token held in a local state, based on a value of a control signal.

12. The method of claim 1, wherein the determining of the relationship comprises determining that the clock periods associated with the clock domain and the at least one other clock domain are unrelated when at least one of following conditions exists:
the clock periods associated with the clock domain and the at least one other clock domain are not rational multiples of one another, or
the clock periods associated with the clock domain and the at least one other clock domain are rational multiples of one another and a least common multiple of the clock periods associated with the clock domain and the at least one other clock domain is larger than a threshold value.

13. The method of claim 1, wherein the clock domain comprises a virtual clock domain created in the multi-clock domain netlist, the virtual clock domain to operate at a selected frequency associated with a period different from the clock periods.

14. A system comprising:
memory to store a plurality of modules; and
one or more processors coupled to the memory to execute the plurality of modules including:
an association module to associate at least one data token with a clock domain of a multi-clock domain netlist of a synchronous circuit design;
a determination module to determine a durational relationship between clock periods associated with the clock domain and at least one other clock domain of the multi-clock domain netlist; and
a transformation module to transform the at least one data token when using the at least one data token in the at least one other clock domain, based on the relationship, the transformation module configured to convert the multi-clock domain netlist of the synchronous circuit design into an asynchronous representation using the at least one data token being transformed.

15. The system of claim 14, further comprising an identification module to identify at least some of the clock domains of the multi-clock domain netlist.

16. The system of claim 14, wherein the determination module is to determine that the clock periods associated with the clock domain and the at least one other clock domain are related.

17. The system of claim 16, wherein the transformation module is to up-sample the at least one data token, when the clock period associated with the clock domain is longer than the clock period associated with the at least one other clock domain.

18. The system of claim 16, wherein the transformation module comprises;
a pattern generator to generate a control signal; and
an up-sampler block to repeat at least one instance of the at least one data token, based on a value of the control signal.

19. The system of claim 16, wherein the transformation module is to down-sample the at least one data token, when the clock period associated with the clock domain is shorter than the clock period associated with the at least one other clock domain.

20. The system of claim 16, wherein the transformation module comprises;
a pattern generator to generate a control signal; and
a down-sampler block to drop at least one instance of the at least one data token, based on a value of the control signal.

21. The system of claim 14, wherein the determination module is to determine that the clock period associated with the clock domain and the at least one other clock domain are unrelated.

22. The system of claim 21, wherein the transformation module comprises;
an up-down sampler including a local state to hold a last value of the at least one data token, the up-down sampler to sample the held last value, based on a value of a control signal.

23. The system of claim 14, wherein the determination module is to determine that the clock periods associated with the clock domain and the at least one other clock domain are unrelated when at least one of following conditions exits:
the clock period associated with the clock domain and the at least one other clock domain are not rational multiples of one another, or
the clock periods associated with the clock domain and the at least one other clock domain are rational multiples of one another and a least common multiple of the clock periods associated with the clock domain and the at least one other clock domain is larger than a threshold value.

24. The system of claim 14, wherein the transformation module is configured to perform the converting such that the asynchronous representation is equivalent to the multi-clock domain netlist of the synchronous circuit design.

25. The system of claim 24, wherein the asynchronous representation comprises at least one asynchronous netlist.

26. The system of claim 14, wherein the determination module is configured to determine a repeating period that corresponds to a least common multiple of the clock periods.

27. A non-transitory machine-readable medium comprising instructions, which when executed by one or more processors, perform a method comprising:
- associating at least one data token with a clock domain of a multi-clock domain netlist of a synchronous circuit design;
- determining a durational relationship between clock periods associated with the clock domain and at least one other clock domain of the multi-clock domain netlist;
- transforming the at least one data token when using the at least one data token in the at least one other clock domain, based on the relationship; and
- converting the multi-clock domain netlist of the synchronous circuit design into an asynchronous representation using the at least one data token being transformed.

28. A processor-implemented method to execute on one or more processors that perform the method comprising:
- converting a synchronous multi-clock domain circuit design into an asynchronous representation by
- generating a multi-clock domain netlist of the synchronous circuit design; and
- converting the multi-clock domain netlist into an asynchronous representation, the converting comprising:
  - associating at least one data token with a clock domain of the multi-clock domain netlist;
  - determining a durational relationship between clock periods associated with the clock domain and at least one other clock domain of the multi-clock domain netlist; and
  - transforming the at least one data token when using the at least one data token in the at least one other clock domain, based on the relationship.

* * * * *

UNITED STATES PATENT AND TRADEMARK OFFICE
CERTIFICATE OF CORRECTION

| | | |
|---|---|---|
| PATENT NO. | : 8,301,933 B2 | Page 1 of 1 |
| APPLICATION NO. | : 12/559102 | |
| DATED | : October 30, 2012 | |
| INVENTOR(S) | : Manohar et al. | |

It is certified that error appears in the above-identified patent and that said Letters Patent is hereby corrected as shown below:

On the Title Page, Item (56)

On page 2, in column 1, under "Other Publications", line 7, delete "Filed" and insert --filed--, therefor On page 2, in column 2, under "Other Publications", line 1, delete "C," and insert --C.,--, therefor On page 2, in column 2, under "Other Publications", line 6, delete "G," and insert --G.,--, therefor On page 2, in column 2, under "Other Publications", line 22, delete "12/550,582 ," and insert --12/550,582,--, therefor In the Specification In column 5, line 21, delete "5 B" and insert --5B--, therefor In the Claims In column 12, line 26, in Claim 18, delete "comprises;" and insert --comprises:--, therefor In column 12, line 37, in Claim 20, delete "comprises;" and insert --comprises:--, therefor In column 12, line 47, in Claim 22, delete "comprises;" and insert --comprises:--, therefor Signed and Sealed this
Twenty-fifth Day of November, 2014

Michelle K. Lee
*Deputy Director of the United States Patent and Trademark Office*